United States Patent
Bocquier

(10) Patent No.: US 9,955,706 B1
(45) Date of Patent: May 1, 2018

(54) METHOD FOR FORMING THREE-DIMENSIONAL CHOCOLATE STRUCTURES

(71) Applicant: Dominique Bocquier, Houston, TX (US)

(72) Inventor: Dominique Bocquier, Houston, TX (US)

( * ) Notice: Subject to any disclaimer, the term of this patent is extended or adjusted under 35 U.S.C. 154(b) by 0 days. days.

(21) Appl. No.: 15/600,153

(22) Filed: May 19, 2017

(51) Int. Cl.
| | |
|---|---|
| *A23G 1/00* | (2006.01) |
| *A23G 1/18* | (2006.01) |
| *A23G 1/20* | (2006.01) |
| *A23G 1/50* | (2006.01) |
| *A23G 3/28* | (2006.01) |
| *A23P 20/15* | (2016.01) |
| *A23G 1/30* | (2006.01) |
| *A23G 7/02* | (2006.01) |
| *A23P 20/25* | (2016.01) |

(52) U.S. Cl.
CPC ............ *A23G 1/0066* (2013.01); *A23G 1/18* (2013.01); *A23G 1/206* (2013.01); *A23G 1/50* (2013.01); *A23G 3/28* (2013.01); *A23P 20/15* (2016.08); *A23G 1/20* (2013.01); *A23G 1/30* (2013.01); *A23G 7/02* (2013.01); *A23P 2020/253* (2016.08)

(58) Field of Classification Search
CPC ........ A23G 1/0066; A23G 1/18; A23G 1/206; A23G 1/50; A23G 3/28; A23G 1/20; A23G 1/30; A23G 7/02; A23P 20/15; A23P 2020/253

USPC ........ 426/302, 306, 307, 512, 580, 601, 660
See application file for complete search history.

(56) References Cited

U.S. PATENT DOCUMENTS

| | | | |
|---|---|---|---|
| 3,821,423 A | 6/1974 | Jamin | |
| 4,382,968 A * | 5/1983 | Akutagawa | ............ A23G 1/205 426/249 |
| 4,455,320 A | 6/1984 | Syrmis | |
| 4,946,696 A * | 8/1990 | Nendl | ....................... A23G 1/22 101/129 |
| 5,705,217 A | 1/1998 | Aasted | |
| 6,217,927 B1 | 4/2001 | Suttle et al. | |
| 2002/0176918 A1 | 11/2002 | Willcocks et al. | |
| 2007/0264399 A1 | 11/2007 | Lucas et al. | |
| 2014/0093625 A1 * | 4/2014 | Beck | .................... B65D 65/463 426/138 |

OTHER PUBLICATIONS

Zuchowski, D., Sugar scultures: Chef designs 'glass' creation with painstaking skill, 2009, post-gazette.com, Pittsburgh Post-Gazette.*

* cited by examiner

*Primary Examiner* — Leslie A Wong
(74) *Attorney, Agent, or Firm* — Egbert Law Offices, PLLC

(57) ABSTRACT

A method of forming a three-dimensional chocolate structure is disclosed wherein a mold is formed from blown sugar. A liquid fat layer is deposited onto the interior of the blown sugar mold. The mold is then cooled such that the liquid fat layer hardens. One or more layers of molten chocolate are deposited over the hardened liquid fat layer and allowed to cool and harden. The mold is then broken or cut so as to expose the three-dimensional chocolate structure therein. A number of chocolate structures can be formed and joined so as to create a complex chocolate structure.

17 Claims, 4 Drawing Sheets

METHOD FOR FORMING THREE-DIMENSIONAL CHOCOLATE STRUCTURES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to chocolate. More particularly, the present invention the relates to the field of the production of three-dimensional chocolate sculptures. Even more particularly, the present invention relates to a process for forming three-dimensional chocolate sculptures without the use of conventional molds.

2. Description of Related Art Including Information Disclosed Under 37 CFR 1.97 and 37 CFR 1.98

Three-dimensional chocolate structures such as chocolate bars and figurines having a desired three-dimensional shape are conventionally produced by molding. In the manufacturing sector, conventional molding employs a very large number of molds. These molds may be made of polycarbonate and are typically flat. The equipment involved in molding is very large and complex and expensive. The creation and tooling of the mold is also very expensive.

In the typical process, molten chocolate is set in the mold, and then the mold and chocolate are allowed to cool. The chocolate hardens and the set chocolate is removed from the mold. Conventional molding techniques place limitations on the size, shape and finish of the final product, and also in product efficiency. As such, various patents issued in the past relating to chocolate molding techniques.

For example, U.S. Pat. No. 5,705,217, issued on Jan. 6, 1998 to Aasted, describes a method and system for the production of chocolate articles. Particularly, the method teaches producing chocolate articles having an outer shell of solid chocolate, wherein a mold cavity is filled with a tempered chocolate mass. Then a supercooled cooling member is immersed into the chocolate mass and lifted clear of it again after a residence time of 2 to 3 seconds. The produced chocolate shells have a uniform wall thickness and an accurately predetermined shell volume.

U.S. Patent Publication No. 2007/0264399, published on Nov. 15, 2007 to Lucas et al., describes a method of manufacturing a chocolate product. In particular, the method of the Lucas publication describes a mold plate used to manufacture chocolates of two or more colors with a thin design, or at least one color on the chocolate of another color.

U.S. Pat. No. 4,455,320, issued on Jun. 19, 1984 to Syrmis, describes a chocolate candy having its upper surface sculpted as the image of a person's face and a method for sculpting a person's face from a photograph onto a chocolate candy by adapting a photographic image of a person's face, converting the adapted image onto a transfer medium or die, and then embossing such adapted image onto chocolate candy.

U.S. Pat. No. 6,217,927, issued on Apr. 17, 2001 to Suttle et al., describes a molding method for chocolate which allows for production of chocolate having detailed surface design and surface gloss. In particular, the patent describes a chilled rotating mold having at least one recess into which liquid chocolate is deposited. Liquid chocolate is held in place by a retaining/casting belt as the rotating mold turns. The liquid chocolate cools and partially sets while in contact with the rotating mold and retaining/casting belt, and a molded chocolate is removed from the recess.

U.S. Patent Publication No. 2002/0176918, published on Nov. 20, 2002 to Willcocks et al., describes a method of shaping chocolate products. In particular, the method involves the use of chilled forming, shaping or embossing devices.

Patents have also issued in the past relating to artistic or sculpted chocolate items. For example, U.S. Pat. No. 3,821,423, issued on Jun. 28, 1974 to Jamin, describes the production of hollow articles made of chocolate.

Food as an art form is very popular worldwide. There are competitions for bakers, confectioners and chocolatiers throughout the world. For example, the World Chocolate Masters focuses on chocolate as a medium. The Food Network and other television networks sponsor artistic food competitions.

There are various methods for producing chocolate in the sculpture form. In the most basic and method, chocolate can be carved from a solid piece into a desired sculpture. However, this requires a great deal of chocolate to produce the desired result. Complex chocolates structures are often formed using molds. These molds can be relatively expensive to make, and the need for such molds places limitations on the chocolate artist in terms of what he or she can produce.

Only using basic materials, chocolate artisans are mostly limited to the production of chocolate items based upon a series of flat elements. Complex structures are difficult to create without the use of molds or carved chocolate blocks.

It is an object of the present invention to provide a method of forming a three-dimensional chocolate structure without the use of conventional molds.

It is another object of the present invention to provide a method of forming a three-dimensional chocolate structure which is relatively inexpensive as compared to prior art methods.

It is another object of the present invention to provide a method of forming a three-dimensional chocolate structure which allows for various sizes and shapes depending on the desires of the particular artisan.

It is yet another object of the present invention provide a method of forming a three-dimensional chocolate structure which utilizes material readily available to food professionals.

It is yet another object of the present invention to provide a method of producing a three-dimensional chocolate structure which is less expensive and much quicker than a structure produced using 3-D printing.

Finally, it is yet another object of the present invention to provide a method of forming a three-dimensional chocolate structure which utilizes blown sugar to produce the mold.

These and other objects and advantages of the present invention will become apparent from a reading of the attached specification and appended claims.

BRIEF SUMMARY OF THE INVENTION

An embodiment of the present invention is a method of forming a three-dimensional chocolate structure including the following steps. First, a mold is formed from blown sugar, the mold having a hollow interior with an opening thereto. Next, a liquid fat is poured into the hollow interior of the mold through the opening. The liquid fat forms a liquid fat layer on the surface of hollow interior. Next, the mold is cooled such that the liquid fat layer hardens. A layer of molten chocolate is then deposited over the hardened liquid fat layer and allowed to harden. The molds is then broken so as to expose a hardened chocolate structure. In the present invention, the liquid fat may be hydrogenated coconut fat or clarified butter.

In the present invention, cooling the mold may be accomplished at room temperature since the liquid fat hardens at room temperature. Alternatively, the cooling may be accomplished in a refrigerated environment.

In the present invention, the mold may be fully filled with the liquid fat and then emptied of the majority of the liquid fat so as to leave the liquid fat layer.

In the present invention, multiple deposited layers of molten chocolate may be placed on the liquid fat layer until a desired thickness of the hardened molten chocolate is reached.

In the present invention, the hollow interior of the mold may be fully filled with a volume of molten chocolate and then emptied of a majority of the volume of molten chocolate so as to leave the layer of molten chocolate.

The liquid fat preferably has a melting temperature less than the melting temperature of the blowing sugar.

In the present invention, as the deposited layer of molten chocolate hardens, a separation is created between the mold and the hardened molten chocolate.

In the present invention, the liquid fat may be a warmed liquid fat which is in a solid-state at room temperature. Preferably, the harden liquid fat layer has a greasy texture.

The steps of the present invention can be repeated so as to create a second hardened chocolate structure in another desired shape. These two hardened chocolate structures may be joined so as to form a complex chocolate structure.

The present invention is also a method of forming a three-dimensional chocolate structure wherein sugar is blown so as to form a mold having a desired shape. The mold has an interior surface. A liquid fat layer is applied to the interior surface of the mold allowed to harden. The layer of molten chocolate is then deposited over the liquid fat layer, and the molten chocolate is allowed to harden. Finally, the hardened chocolate structure is removed from the mold. Multiple layers of deposited molten chocolate may be applied so as to reach a desired thickness of hardened molten chocolate.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1A:
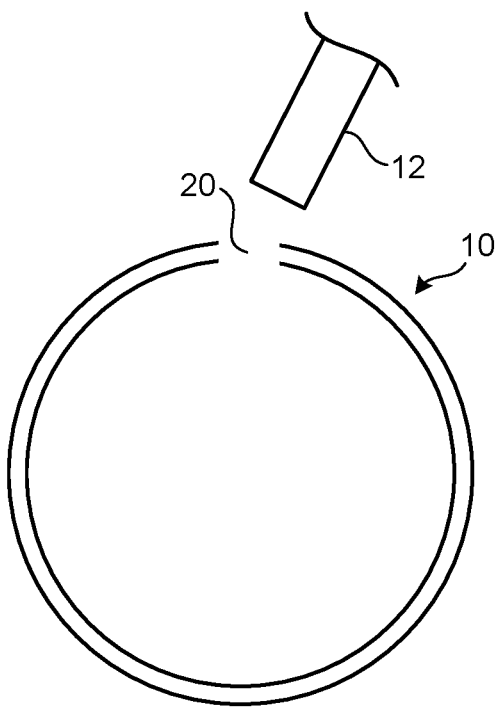
FIGS. 1A-1F illustrate the various steps of the method of producing a three-dimensional chocolate structure of the present invention.

FIGS. 1A-1F illustrate the steps of the method of the present invention. The method is provided for forming a three-dimensional chocolate structure. Referring to FIG. 1A, the first step of the present invention is disclosed. FIG. 1A illustrates the formation of a sugar mold 10 with a tube 12. The sugar mold 10 is illustrated in the form of a globe. However, an endless variety of shapes can be formed under the present invention. The sugar mold 10 is illustrated as having a hollow interior 14 and an opening 20 into the interior of the sugar mold 10.

The sugar mold 10 is formed using a process known as "blown sugar". Blown sugar is a known process in the art and is similar to the commonly-known process of glass blowing. Blown sugar is formed from pulled sugar. Pulled sugar involves cooking sugar so as to form a liquid sugar. The liquid sugar is formed into a mat and then folded upon itself repeatedly. This sugar is then stretched and again folded on itself repeatedly. Blown sugar involves the additional steps of utilizing a tube 12 to blow the pulled sugar into a desired form. Skilled artisans can utilize blown sugar to create very complex structures such as the structure shown in FIG. 3. As with chocolate, there are many competitions which include sugar sculpture which utilizes blown sugar. The blown sugar mold 10 is formed entirely of sugar and sugar derivatives.

Figure 1B:
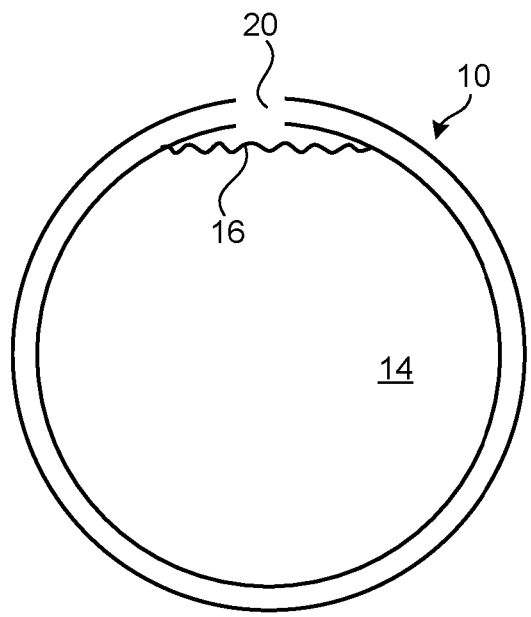

Referring to FIG. 1B, the next step in the present invention is illustrated. In this step, a liquid fat 16 is poured into the hollow interior 14 of the sugar mold 10. The sugar mold 10, previously allowed to harden, can support the weight of the liquid fat 16 poured into the interior 14 of the sugar mold 10. FIG. 1B illustrated the liquid fat 16 as a filling an entirety of the interior volume 14 of the sugar mold 10. The liquid fat 16 is poured to the opening 20 of sugar mold 10. The liquid fat 16 importantly has a melting temperature less than the melting temperature of blown sugar.

The liquid fat 16 can include substances such as a clarified butter or hydrogenated coconut fat. Probably, the liquid fat is a vegetable fat. Hydrogenated coconut fat is known as "coconut fat" in Europe, Copha in Australia, Vegetaline in France, Palmin in Germany, and Kremelta in New Zealand. This type of vegetable fat is not readily available in the United States.

Figure 1C:
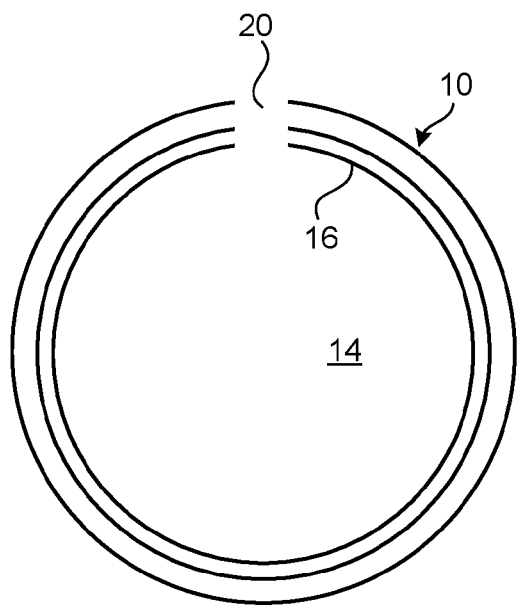

After the liquid fat 16 has been poured into the sugar mold 10, the sugar mold 10 is emptied of the majority of the liquid fat 16, such that a liquid fat layer 16, as illustrated in FIG. 1C, is left on the interior surface of the sugar mold 10. The sugar mold 10 is allowed to cool such that the liquid fat 16 hardens within the interior of the sugar mold 10. This hardening can occur at room temperature or in refrigerated state, depending on the nature of the liquid fat 16. The hardened liquid fat layer preferably has a greasy texture.

The liquid fat 16 may be warmed liquid fat which is in a solid state at room temperature. In this case, the liquid fat harden at room temperature once it is allowed to cool. The liquid fat 16 must be allowed to hardened. As such, no shortening may be utilized. The fat is utilized such that the chocolate does not stick to the sugar mold, which would be the case if the fat layer were not provided.

Figure 1D:
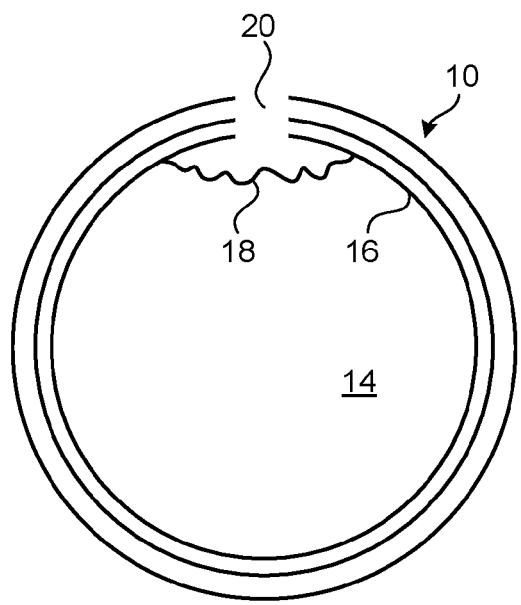

FIG. 1D illustrates the next step of the method of the present invention. In FIG. 1D, it can be seen how molten chocolate 18 is used to fill the interior 14 of the sugar mold 10. Preferably, a large volume of molten chocolate 18 is utilized to entirely fill the interior volume 14 of the sugar mold 10. The mold 10 is then emptied of the majority of the molten chocolate 18 allowing a layer of molten chocolate 18 to remain deposited over the hardened liquid fat layer 16.

Figure 1E:
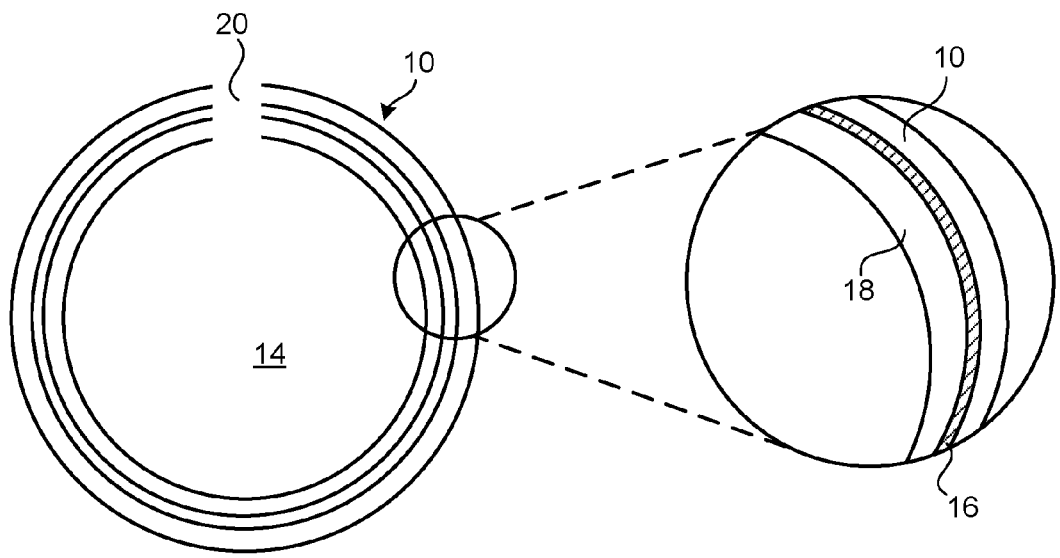
Figure 1F:
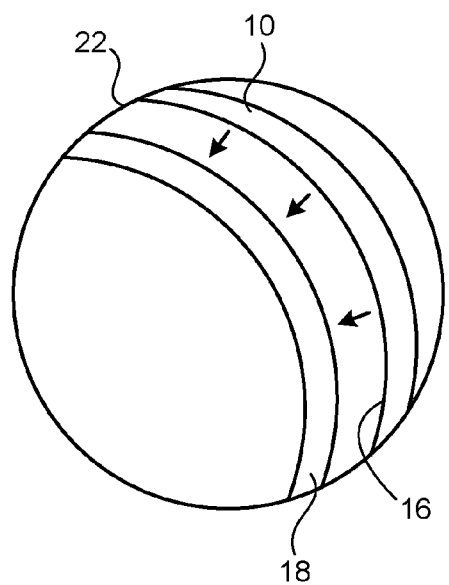

The various layers are illustrated in FIG. 1E. As can be seen, the hardened liquid fat layer 16 is positioned between the interior of the sugar mold 10 and the newly deposited layer of molten chocolate 18. The deposited layer of molten chocolate 18 is allowed to harden, preferably in a refrigerated state.

In some cases, the multiple steps deposition and hardening of chocolate are undertaken until a desired thickness of hardened molten chocolate is reached within the interior volume of the sugar mold 10.

As the chocolate 18 hardens, it shrinks and a space 22 is formed between the interior surface of the sugar mold 10 and the chocolate layer 18. This space 22 allows for easier separation of the chocolate from the sugar mold 10. The liquid fat is not shown in FIG. 1E, but may be dispersed between the chocolate and sugar mold layers.

Figure 2:
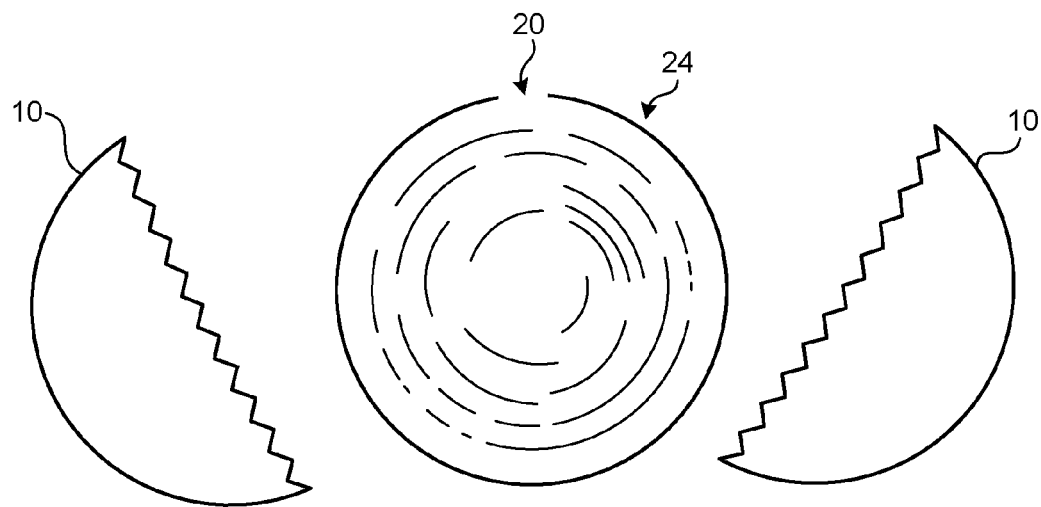
FIG. 2 shows the completed chocolate structure as produced by the present invention.
Figure 3:
FIG. 3 shows an example of a complex structure which can be created using the process of the present invention.

Once the final layer of molten chocolate has been allowed harden, the sugar mold 10 can then be broken as shown in FIG. 2. The sugar mold can be broken by striking it with a mallet, by cutting, or by other means. Once the sugar mold 10 is removed, then the hardened chocolate structure 24 remains. As illustrated in FIG. 2, the chocolate structure 24 is in the form of a globe. However, the shapes and sizes formable by the process or method of the present invention is only limited by the skill of the artisan in the sugar blown process. The steps of the present invention can be repeated so as to form other chocolate structures which can be joined together so as to create a complex structure as shown in FIG. 3. As can be seen in FIG. 3, the elaborate, complex structure 26 comprises a number of discrete complex elements 28. Without the use of an expensive mold, the complex elements 28 cannot be formed using methods of the prior art. Due to the present invention, these complex elements 28 are formable using common kitchen ingredients, namely sugar and chocolate.

The chocolate structures 24 formable by the process of the present invention are not limited to solid or hollow three-dimensional structures such as the globe, but can be in the form of a bowl or any other conceivable shape.

During experimentation, it was discovered that butter could not be successful used in the process of the present invention. Clarified butter, however, was an effective fat layer between the sugar mold 10 and the chocolate 18.

Utilizing the method of the present invention, a skilled artisan can create any number of designs with chocolate without being inhibited by the need for fabricated molds. As discussed hereinabove, the fabrication of molds is extremely expensive as compared to the raw material utilized in the process of the present invention. Shapes and designs can be made in specific sizes depending on the needs of the artisan purchaser of the art.

The process of the present invention is also cheaper and much less time-consuming than deposition-based 3-D printing.

Blown glass could theoretically be utilized in place of the sugar mold of the present invention. However, production of chocolate structures utilizing blown glass would be expensive and unnecessary given the novel process of the present invention.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A method of forming a three-dimensional chocolate structure, the method comprising:
    forming a mold from blown sugar, said mold having a hollow interior with an opening thereto;
    pouring a liquid fat into said hollow interior of said mold through said opening, said liquid fat forming a liquid fat layer on a surface of said hollow interior, said liquid fat being hydrogenated coconut fat or clarified butter;
    cooling said mold such that said liquid fat layer hardens;
    depositing a layer of molten chocolate over the hardened liquid fat layer;
    allowing the deposited layer of molten chocolate to harden; and
    breaking the mold so as to expose a hardened chocolate structure.

2. The method of claim 1, the step of cooling comprising: hardening said liquid fat at room temperature.

3. The method of claim 1, the step of cooling comprising: hardening said liquid fat in a refrigerated environment.

4. The method of claim 1, the step of pouring comprising:
    fully filling said hollow interior of said mold with said liquid fat; and
    emptying said mold of a majority said liquid fat so as to leave said liquid fat layer.

5. The method of claim 1, further comprising:
    repeating the steps of depositing a layer of molten chocolate over the hardened liquid fat layer and allowing the deposited layer of molten chocolate to harden until a desired thickness of hardened molten chocolate is reached.

6. The method of claim 1, the step of depositing comprising:
    fully filling said hollow interior of said mold with a volume of molten chocolate; and
    emptying said mold of a majority of said volume of molten chocolate so as to leave said layer of molten chocolate.

7. The method of claim 1, said liquid fat having a melting temperature less than a melting temperature of said blown sugar.

8. The method of claim 1, said step of allowing comprising:
    hardening said deposited layer of molten chocolate so as to create a separation between said mold and the hardened molten chocolate.

9. The method of claim 1, said liquid fat being warmed liquid fat which is in a solid state at room temperature.

10. The method of claim 1, the hardened liquid fat layer having a greasy texture.

11. The method of claim 1, further comprising:
repeating all steps so as to create a second hardened chocolate structure in a second desired shape; and
joining the hardened chocolate structure and the second hardened chocolate structure so as to form a complex structure.

12. A method of forming a three-dimensional chocolate structure, the method comprising:
blowing sugar so as to form a mold having a desired shape, said mold having an interior surface;
applying a liquid fat layer to said interior surface of said mold said liquid fat layer being hydrogenated coconut fat or clarified butter;
allowing said liquid fat layer to harden;
depositing a layer of molten chocolate over the hardened liquid fat layer;
allowing the deposited layer of molten chocolate to harden; and
removing the hardened chocolate structure from the mold.

13. The method of claim 12, further comprising:
repeating the steps of depositing a layer of molten chocolate over the hardened liquid fat layer and allowing the deposited layer of molten chocolate to harden until a desired thickness of hardened molten chocolate is reached.

14. The method of claim 12, said liquid fat having a melting temperature less than a melting temperature of the blown sugar.

15. The method of claim 12, wherein during the step of allowing the deposited layer of molten chocolate to harden, the hardening molten chocolate shrinks so as to separate itself from the interior surface of the mold.

16. The method of claim 12, said liquid fat having a melting temperature less than a melting temperature of the blown sugar.

17. The method of claim 12, said liquid fat being warmed liquid fat which is in a solid state at room temperature.

* * * * *